April 30, 1968   J. L. CULPEPPER, JR., ET AL   3,380,470
FLOW REGULATOR WITH RADIALLY EXPANDING ELASTOMERIC BLOCK
Filed Nov. 30, 1965                                    2 Sheets-Sheet 1

INVENTORS
JESSE L. CULPEPPER JR.
NORMAN H. SACHNIK
BY
ATTORNEYS

INVENTORS
JESSE L. CULPEPPER JR.
NORMAN H. SACHNIK
BY Norman A. Witt

ATTORNEYS

United States Patent Office 3,380,470
Patented Apr. 30, 1968

3,380,470
FLOW REGULATOR WITH RADIALLY EXPANDING ELASTOMERIC BLOCK
Jesse L. Culpepper, Jr., and Norman H. Sachnik, Houston, Tex., assignors to Texsteam Corporation, Houston, Tex., a corporation of Texas
Filed Nov. 30, 1965, Ser. No. 510,648
1 Claim. (Cl. 137—269)

ABSTRACT OF THE DISCLOSURE

Fluid flow regulator having a radially expandable block of elastomeric material for varying fluid flow through a tubular body, including a liner that may be replaced by a liner of another size.

---

This invention relates in general to a fluid flow regulator, and more particularly to a fluid flow regulator for use in a transmission conduit to provide laminar fluid flow with a minimum amount of turbulence and regulated volume flow, and still more particularly to an improved fluid flow regulator.

The flow regulator of the present invention includes a tubular body having arranged therein a block of elastomeric material that is fixed at one end and provided with actuating means at the other end to cause radial expansion of the block and thereby vary the flow of fluid thereby.

Heretofore, flow regulators have been developed such as the one disclosed in the Welker Patent 2,917,269, granted Dec. 15, 1959, but such regulators have had a difficulty that has contributed to short lives. Particularly, the elastomeric block or rubber block that is expanded in the tubular body has failed due to cutting and fatigue caused by the members attached at opposite ends thereof. Moreover, the length of travel of the hydraulic actuator has been unduly extended which has caused excessive wear on the moving parts.

Therefore, it is an object of the present invention to provide a new and improved fluid flow regulator for controlling fluid flow in a transmission conduit.

Another object of this invention is in the provision of a fluid flow regulator having a new and improved elastomeric member operable with a tubular body, wherein longer life and more efficient operation of the regulator is accomplished.

Still another object of this invention resides in the provision of a fluid flow regulator including an elastomeric block expandable within a tubular body for controlling fluid flow thereby that is constructed to reduce turbulence and hysteresis, decrease the compressive strain insuring action on the elastomeric block, decrease the pressure drop across the regulator while improving regulation, and to enable easier maintenance.

A further object of this invention is to provide a fluid flow regulator including a tubular body having an expandable elastomeric member therein and a hydraulic actuator for expanding the elastomeric member, wherein the regulator is constructed to reduce the effects of contamination of the gas stream with the hydraulic system and to reduce the length of travel required by the actuator to operate the elastomeric member.

Other objects, features and advantages of the invention will be apparent from the following detailed disclosure, taken in conjunction with the accompanying sheets or drawings, wherein like reference numerals refer to like parts, in which:

FIG. 5 is a view similar to FIG. 4 and illustrating the full expansion of the elastomeric member to close the flow control opening thereby;

Figure 1:
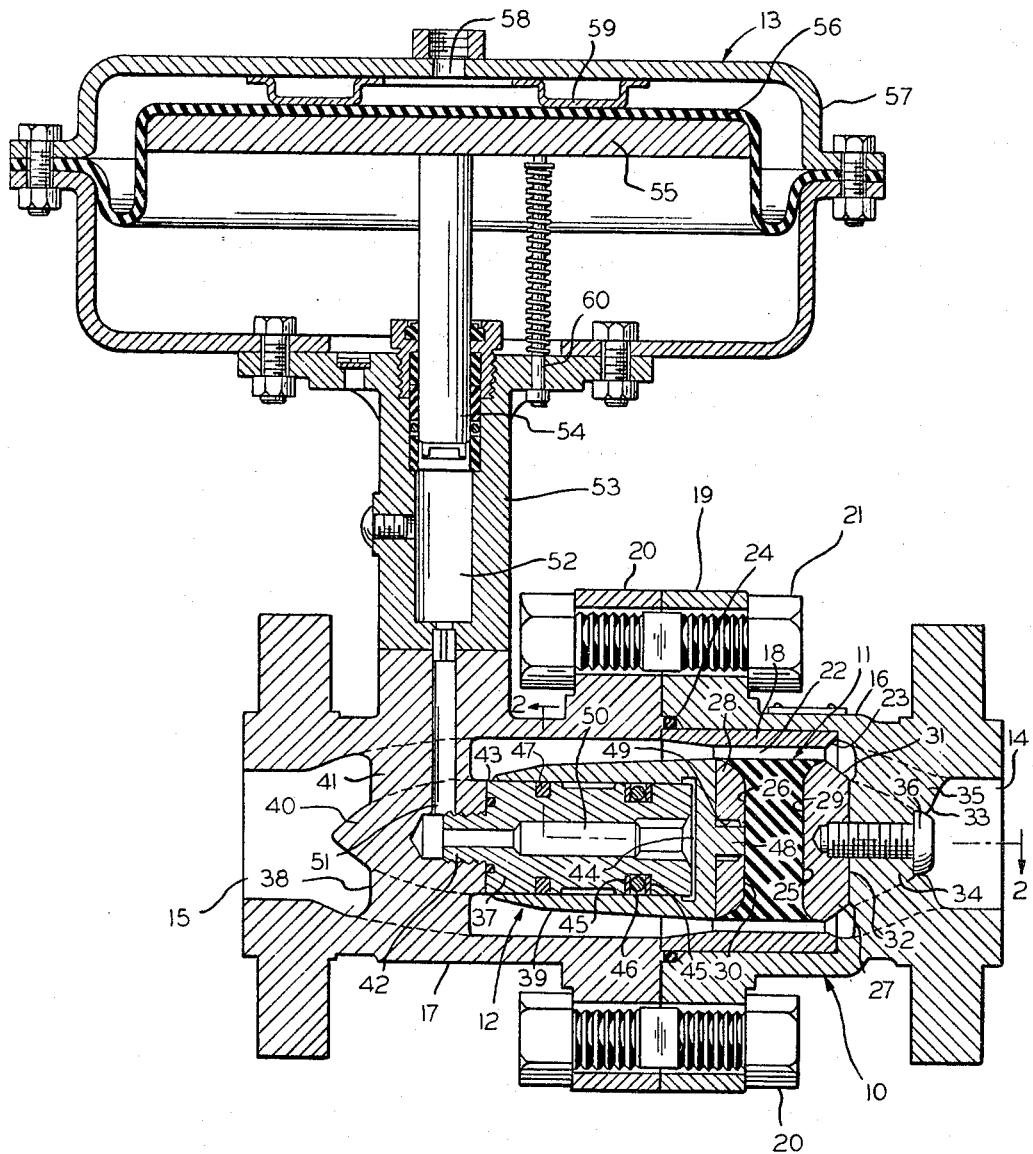
FIG. 1 is a vertical sectional view taken through the flow regulator of the present invention.
Figure 2:
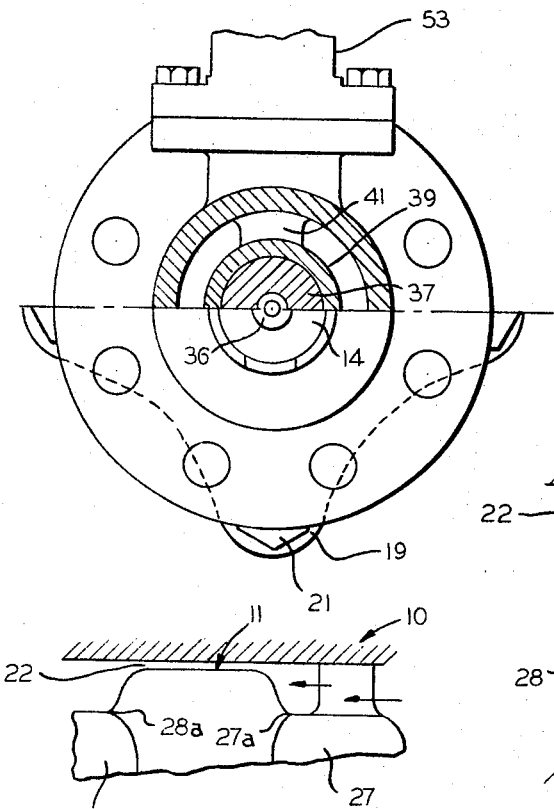
FIG. 2 is a sectional view of the regulator in FIG. 1 taken substantially along line 2—2 thereof.

Referring now to the drawings, and particularly to FIG. 1, the fluid flow regulator of the present invention includes generally a tubular body 10, an elastomeric member 11 arranged within the tubular body, and a hydraulic actuator 12 for operating the elastomeric member or block 11. A pneumatic actuator 13 is employed for producing a source of pressurized fluid to operate the hydraulic actuator 12, although any other source of pressurized fluid may be employed for operating the hydraulic actuator 12.

The tubular body or casing 10 includes an inlet 14 and an outlet 15, fluid flow going from the inlet to the outlet. Suitable flanges are provided at the inlet and outlet for interconnecting the tubular body with conduit at each end. Although the tubular body includes sections 16 and 17, it should be appreciated that the body may be made in one piece. However, the sectional tubular body enables the employment of a liner 18 which is placed in an opposed position to the elastomeric member 11. The adjacent ends of the sections 16 and 17 are provided with flanges 19 and 20, respectively through which fasteners 21 are applied in order to fasten the sections together. With the sections 16 and 17 separated, it can readily be appreciated that the liner 18 may be removed from the section 16 and replaced with another liner of the same dimension or with another liner having a different internal diameter to vary the flow control opening 22 that is defined between the exterior face of the elastomeric block 11 and the internal face of the liner 18. The liner 18 abuts against a shoulder 23 and on the interior surface of the section 16 and is held in place by the abutting end of the section 17 when the sections 16 and 17 are assembled. It may also be noted that the abutting edges of the liner and tubular body sections are of the same diameter in order to reduce turbulence in the area. An O-ring 24 is provided between the sections 16 and 17 and adjacent the liner 18 to prevent leakage of fluid at the junction of the sections. While the elastomeric block 11 is essentially cylindrical and the internal diameter of the liner 18 is also cylindrical to thereby define an annuarly shaped flow control opening 22, it may be appreciated that the geometrical configurations of these elements may be otherwise shaped.

The elastomeric member 11 includes cup-shaped opposite ends 25 and 26, and is essentially cylindrical in shape or of the same shape as the interior of the tubular body with which it cooperates to define the flow control opening 22. The dome shaped end 29 of the attaching member 27 mates with the cup-shaped end 25 of the elastomeric member 11, while the dome shaped end 30 of the attaching member 28 mates with the cup-shaped end 26 of the elastomeric member. A frusto-conical surface 31 is provided on the attaching member 27 with its larger end joining the periphery of the dome shaped end 29 and its smaller end terminating in a flat surface 32 that is adapted to engage against a spider or support member 33. The spider or support member 33 is arranged just inside of the inlet 14 and provides a means for fixedly supporting one end of the elastomeric block to the tubular body. The spider or support member 33 includes an axially positioned body 34 having a plurality of radially extending webs 35 defining therebetween fluid flow passageways. A fastener 36 extends through the body 34 and into a threaded opening in the attaching member 27 to secure the attaching member to the supporting member. The attaching members 27 and 28 are suitably secured to the ends of the elastomeric member 11 by bonding or any other suitable method.

The hydraulic actuator 12 includes a piston 37 secured to the downstream spider or supporting member 38, and a cylinder 39 abutting against the attachment member 28. The support member 38 includes a body 40 axially centered in the tubular body section 17 and a plurality of radially extending arms 41 defining fluid flow passageways therebetween in a similar manner to the support member 33. The piston 37 includes a threaded end 42 threadedly received in a tapped opening formed in the body 40 of the support member 38 and an O-ring 43 is provided between the piston and body to prevent leakage along the engaging surfaces. The cylinder 39 is slidable on the piston 37 and defines with the head of the piston a fluid pressure chamber 44. In order to prevent leakage between the piston and the cylinder, a pair of grooves are formed in the piston to receive back-up rings 45 and an O-ring 46 in one of the grooves, and a wiper ring 47 in the other groove. An integrally mounted and axially arranged guide pin 48 is formed on the upstream end of the cylinder 39 to be received in an opening 49 formed in the attaching member 28 to maintain the downstream end of the elastomeric member 11 in proper axial position relative to the tubular body.

The axial center of the piston 37 is provided with a fluid passageway 50 that communicates with a fluid passageway 51 formed in the support member 38 and extending upwardly through one of the arms to communicate with a pumping chamber 52 formed in the casing 53 that is attached to the tubular body section 17. A pumping piston 54 slidably reciprocates in the fluid chamber 52 and is connected to a diaphragm back-up member 55 that engages a diaphragm 56 arranged in a pneumatic motor housing 57 of the pneumatic actuator 13. An inlet 58 is provided in the housing 57 for connection to a source of pneumatic energy for operating the pneumatic actuator 13. The actuator is shown in the position where no pressure is being applied against the diaphragm 56 and it therefore is in engagement with a stop or rest member 59. The pressure chamber 52 and intercommunicating passageways to the fluid pressure chamber 44 are filled with hydraulic fluid, whereby operation of the pneumatic actuator 13 and downward movement of the piston 54 forces the hydraulic fluid into the chamber 44 and movement of the cylinder 39 upstream away from the stationary piston 37 to cause expansion of the elastomeric member 11 within the tubular body. Similarly, upon release of pressure against the diaphragm 56, the elastomeric member tends to return to its original shape and therefore forces the cylinder 39 against the piston 37 to return the fluid into the chamber 52 and also force the piston 54 and diaphragm 56 to its upper position as shown in FIG. 1. An indicator rod 60 is connected to the diaphragm back-up member 55 and therefore moves with the back-up member to indicate the position of the diaphragm and ultimately the expansion position of the elastomeric member 11.

Figure 6:
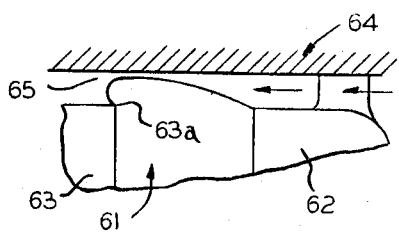
FIG. 6 is a view similar to FIG. 4, but illustrating the prior art wherein the elastomeric member is under pressure.
Figure 7:
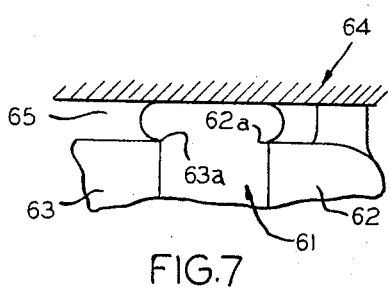
FIG. 7 is a view similar to FIG. 6 and illustrating further the prior art wherein the elastomeric member is formed to close the flow control opening thereby.

Referring now to FIGS. 6 and 7, the prior art is illustrated to show the disadvantages thereof, wherein an elastomeric member 61, arranged between a stationary attaching means 62 and a movable attaching means 63 within a tubular member 64 defines a flow control opening 65. FIG. 7 shows the inner valve or elastomeric member 61 fully compressed, whereas the sharp corners 62a and 63a of the attaching members tend to cut and fatigue the elastomeric member at those points. And FIG. 6 illustrates a partially compressed elastomeric member wherein there is a pressure drop thereacross and a folding of the elastomeric member at the corner 63a which sets up a stress in the elastomeric member and ultimately causes shearing or cutting thereof and failure thereof.

Figure 4:
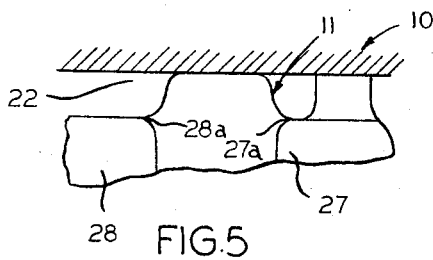
FIG. 4 is a diagrammatic view, partially fragmentary, illustrating partial expansion of the elastomeric member of the present invention, and the shape of the member when it is under pressure.

As seen in FIG. 5, the elastomeric member 11 of the present invention is shown fully extended to engage the tubular body and prevent fluid flow, wherein there is a minimum of folding and/or shearing of the elastomeric member relative to the corners 27a and 28a of the corresponding attaching members. Thus the deep radius of the attaching members and elastomeric member reduces stress at the points 27a and 28a. And FIG. 4 shows the elastomeric member 11 of the present invention in controlling position wherein a pressure drop exists thereacross and also illustrates the general form on the downstream side at 28a.

Figure 3:
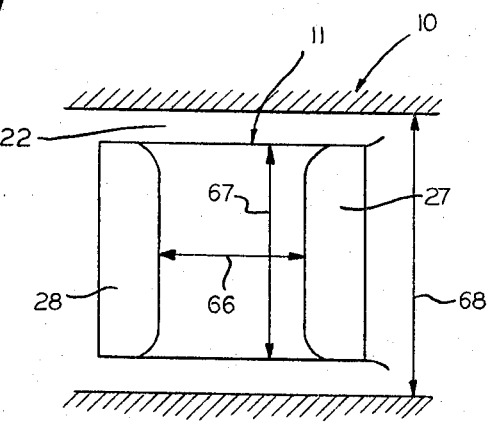
FIG. 3 is a diagrammatic view of the elastomeric member according to the present invention and illustrating its dimensions relative to the tubular member.

Referring to FIG. 3, 66 represents the axial length of the elastomeric member 11, while 67 represent the diametrical size thereof, and 68 represents the inner diameter of the tubular body 10. It can be seen that adjustments made in the values of 66/67 and 67/68 over the prior art of FIGS. 6 and 7 have given improved wear conditions on the O-rings and other components of the closed hydraulic system by reducing the length of travel required to operate the inner valve or elastomeric member 11. The best constant value for the ratio 66/67 is .5, while the best constant value for the ratio 67/68 is .875.

It will be understood that modifications and variations may be effected without departing from the scope of the novel concepts of the present invention, but it is understood that this application is to be limited only by the scope of the appended claim.

The invention is hereby claimed as follows:

1. A fluid flow regulator for a conduit comprising, a tubular body having an inlet end and an outlet end, an elastomeric block positioned within said body having peripheral clearance with the inner diameter thereof to define a flow control opening therewith, a first support member fixed in said body at one end thereof, a second support member fixed in said body at the other end thereof, both said support members having openings therethrough for the passage of fluid therethrough, means for attaching one end of said block to one of said support members, and a fluid actuator for radially expanding said block to control fluid flow through said flow control opening, said actuator including a stationary piston attached to said other of said support members and a movable cylinder attached to the other end of said block, and a liner opposed to said block that may be replaced by a liner of another size to vary the flow capacity through the flow control opening.

References Cited

UNITED STATES PATENTS

| | | | |
|---|---|---|---|
| 2,475,748 | 9/1949 | Leroy | 138—90 |
| 2,611,438 | 9/1952 | Hanline et al. | 251—191 X |
| 2,857,138 | 10/1958 | Svendsen et al. | 251—191 X |
| 2,917,269 | 12/1959 | Welker | 251—57 X |
| 607,492 | 7/1898 | Thomas et al. | 251—189 X |
| 1,911,905 | 5/1933 | Knowlton | 251—205 X |

M. CARY NELSON, *Primary Examiner.*

A. ROSENTHAL, *Assistant Examiner.*

Disclaimer 3,380,470.—*Jesse L. Culpepper, Jr.* and *Norman H. Sachnik*, Houston, Tex. FLOW REGULATOR WITH RADIALLY EXPANDING ELASTOMERIC BLOCK. Patent dated Apr. 30, 1968. Disclaimer filed Oct. 3, 1977, by the assignee, *Vapor Corporation*.

Hereby enters this disclaimer to all claims of said patent.

[*Official Gazette January 17, 1978.*]